United States Patent
Hu et al.

(10) Patent No.: US 11,132,222 B2
(45) Date of Patent: Sep. 28, 2021

(54) APPLICATION PROCESSING METHOD AND APPARATUS FOR JUMPING BETWEEN CHILD APPLICATIONS AND STORAGE MEDIUM

(71) Applicant: TENCENT TECHNOLOGY (SHENZHEN) COMPANY LIMITED, Shenzhen (CN)

(72) Inventors: Haojun Hu, Shenzhen (CN); Kai Li, Shenzhen (CN); Shangtao Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 178 days.

(21) Appl. No.: 16/532,089

(22) Filed: Aug. 5, 2019

(65) Prior Publication Data
US 2019/0361737 A1    Nov. 28, 2019

Related U.S. Application Data

(63) Continuation of application No. PCT/CN2018/085527, filed on May 4, 2018.

(30) Foreign Application Priority Data

Jun. 30, 2017   (CN) .......................... 201710524874.0

(51) Int. Cl.
  *G06F 9/48*    (2006.01)
  *G06F 9/448*   (2018.01)
(52) U.S. Cl.
  CPC .......... *G06F 9/4881* (2013.01); *G06F 9/4484* (2018.02); *G06F 9/485* (2013.01)

(58) Field of Classification Search
  None
  See application file for complete search history.

(56) References Cited

U.S. PATENT DOCUMENTS 7,533,121 B2 *   5/2009  Hilerio ................... G06Q 10/00
                                                        707/805
9,129,259 B2 *   9/2015  Camera .................. G06Q 50/01
                        (Continued)

FOREIGN PATENT DOCUMENTS

CN    103955466 A    7/2014
CN    106020634 A    10/2016
                (Continued)

OTHER PUBLICATIONS

Liang et al. "Research on Development Architecture of WeChat Platform", 2017 IEEE, pp. 2512-2516.*
(Continued)

*Primary Examiner* — Van H Nguyen
(74) *Attorney, Agent, or Firm* — Anova Law Group, PLLC

(57) ABSTRACT

An application processing method includes: displaying a first child application page of a first child application; and acquiring, by using the first child application, a second child application identifier corresponding to a second child application to be jumped to. The first child application is run by a parent application. The method also includes: the parent application running the second child application when a jump is made from the first child application to the second child application; transferring page data corresponding to the second child application identifier to the second child application; and generating, according to the page data, a second child application page over the first child application page, and displaying the second child application page.

15 Claims, 8 Drawing Sheets

(56) References Cited

U.S. PATENT DOCUMENTS

| | | | |
|---|---|---|---|
| 9,244,593 B2* | 1/2016 | Wang | G06F 3/0482 |
| 9,519,409 B2* | 12/2016 | Xing | G06F 3/0481 |
| 9,880,861 B2* | 1/2018 | Wang | G06F 9/451 |
| 10,659,311 B2* | 5/2020 | Yu | H04L 41/14 |
| 2008/0103860 A1* | 5/2008 | Hilerio | G06Q 10/00 707/732 |
| 2011/0292428 A1 | 12/2011 | Ishii | |
| 2013/0144948 A1* | 6/2013 | Camera | G06F 17/00 709/204 |
| 2014/0089947 A1 | 3/2014 | Han et al. | |
| 2014/0283012 A1 | 9/2014 | Eggerton et al. | |
| 2017/0269961 A1 | 9/2017 | Fan et al. | |
| 2018/0373427 A1* | 12/2018 | Wang | G06F 3/04842 |
| 2019/0272193 A1 | 9/2019 | Hu et al. | |

FOREIGN PATENT DOCUMENTS

| | | |
|---|---|---|
| CN | 106502736 A | 3/2017 |
| CN | 106569900 A | 4/2017 |
| CN | 106598655 A | 4/2017 |
| CN | 106775420 A | 5/2017 |
| CN | 106802803 A | 6/2017 |
| CN | 107357644 A | 11/2017 |
| JP | 2011245763 A | 12/2011 |
| KR | 20140040379 A | 4/2014 |
| KR | 20170045269 A | 4/2017 |

OTHER PUBLICATIONS

The World Intellectual Property Organization (WIPO) International Search Report for PCT/CN2018/085527 dated Aug. 1, 2018 5 Pages (including translation).

The State Intellectual Property Office of the People's Republic of China (SIPO) Office Action 1 for 201710524874.0 dated May 24, 2018 8 Pages (including translation).

The Japan Patent Office (JPO) gotification of Reasons for Refusal for Application No. 2019-563361 and Translation dated Jan. 19, 2021 6 Pages (including translation).

Korean Intellectual Property Office (KIPO) Office Action 1 for 20197027548 dated Nov. 5, 2020 10 Pages (including translation).

The European Patent Office (EPO) The Extended European Search Report for 18824354.7 dated Feb. 23, 2021 8 Pages (including translation).

* cited by examiner

APPLICATION PROCESSING METHOD AND APPARATUS FOR JUMPING BETWEEN CHILD APPLICATIONS AND STORAGE MEDIUM

CROSS-REFERENCES TO RELATED APPLICATIONS

This application is a continuation application of PCT Patent Application No. PCT/CN2018/085527, filed on May 4, 2018, which claims priority to Chinese Patent Application No. 201710524874.0, entitled "APPLICATION PROCESSING METHOD AND APPARATUS, STORAGE MEDIUM, AND COMPUTER DEVICE" filed on Jun. 30, 2017, the entire contents of both of which are incorporated herein by reference.

FIELD OF TECHNOLOGY

The present application relates to the field of computer technologies, and in particular, to an application processing method and apparatus and a storage medium.

BACKGROUND OF THE DISCLOSURE

An application is a code instruction sequence or is a symbolized instruction sequence or a symbolized statement sequence that may be automatically converted into a code instruction sequence, where the code instruction sequence may be executed by a terminal such as a computer having an information processing capability to obtain a result. Currently, a user may install various applications such as a photographing application, a social networking application or an email application on a terminal, so as to use these applications installed on the terminal to implement various functions such as a photographing function, a social networking function or an email management function.

SUMMARY

Embodiments of the present application provide an application processing method and apparatus and a storage medium.

An application processing method is applied to a terminal. The method includes: displaying a first child application page of a first child application; and acquiring, by using the first child application, a second child application identifier corresponding to a second child application to be jumped to. The first child application is run by a parent application. The method also includes: running, by the parent application, the second child application when a jump is made from the first child application to the second child application; transferring page data corresponding to the second child application identifier to the second child application; and generating, according to the page data, a second child application page over the first child application page, and displaying the second child application page.

An application processing apparatus includes a processor and a memory, the memory storing computer readable instructions, and the instructions enabling the processor to: display a first child application page of a first child application; and acquire, by using the first child application, a second child application identifier corresponding to a second child application to be jumped to. The first child application is run by a parent application. The processor is also enabled to: run, by the parent application, the second child application when a jump is made from the first child application to the second child application; transfer page data corresponding to the second child application identifier to the second child application; and generate, according to the page data, a second child application page over the first child application page, and displaying the second child application page.

A non-transitory computer readable storage medium stores computer readable instructions, when being executed by a processor, the computer readable instructions enabling the processor to perform the following steps: displaying a first child application page of a first child application; and acquiring, by using the first child application, a second child application identifier corresponding to a second child application to be jumped to. The first child application is run by a parent application. The computer readable instructions also cause the processor to perform: running, by the parent application, the second child application when a jump is made from the first child application to the second child application; transferring page data corresponding to the second child application identifier to the second child application; and generating, according to the page data, a second child application page over the first child application page, and displaying the second child application page.

DESCRIPTION OF EMBODIMENTS

To make the objectives, the technical solutions, and the advantages of the present application clearer, the following further describes the present application in detail with reference to the accompanying drawings and the embodiments. It should be understood that the specific embodiments described herein are only used to describe the present application instead of limiting the present application.

Figure 1:
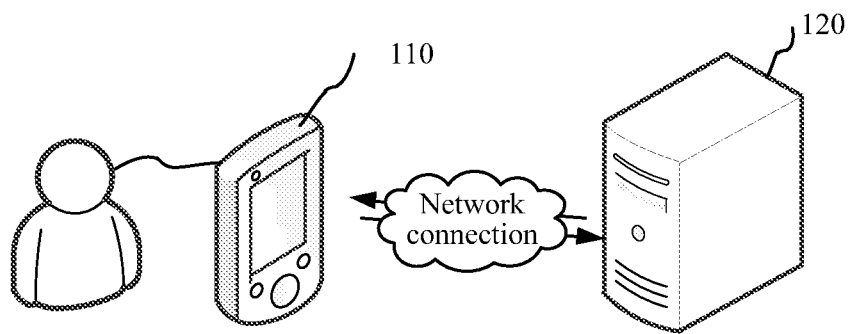
FIG. 1 is a diagram of an application environment of an application processing system according to an embodiment of the present application.

FIG. 1 is a diagram of an application environment of an application processing system according to an embodiment of the present application. Referring to FIG. 1, the application processing system includes a terminal 110 and a server 120. The terminal 110 and the server 120 are connected via a network. An OS runs on the terminal 110. A parent application runs on the OS. The terminal 110 implements an application processing method, so as to implement a child application jump by using the parent application. A jump, as used herein, may refer to a redirect event (or a switch event) from one child application page to another child application page within the parent application, a redirect event from a parent application page to a child application page, or a redirect event from a child application page to the parent application page. The redirect/jump event may be triggered in response to a user instruction and/or when certain conditions are satisfied. The terminal 110 may specifically create a child application logic layer unit and a corresponding child application view layer unit by using the parent application. A child application view layer processing unit may be configured to generate a child application page. The server 120 may store data required to generate the child application page, for example, page data corresponding to a child application identifier.

Figure 2:
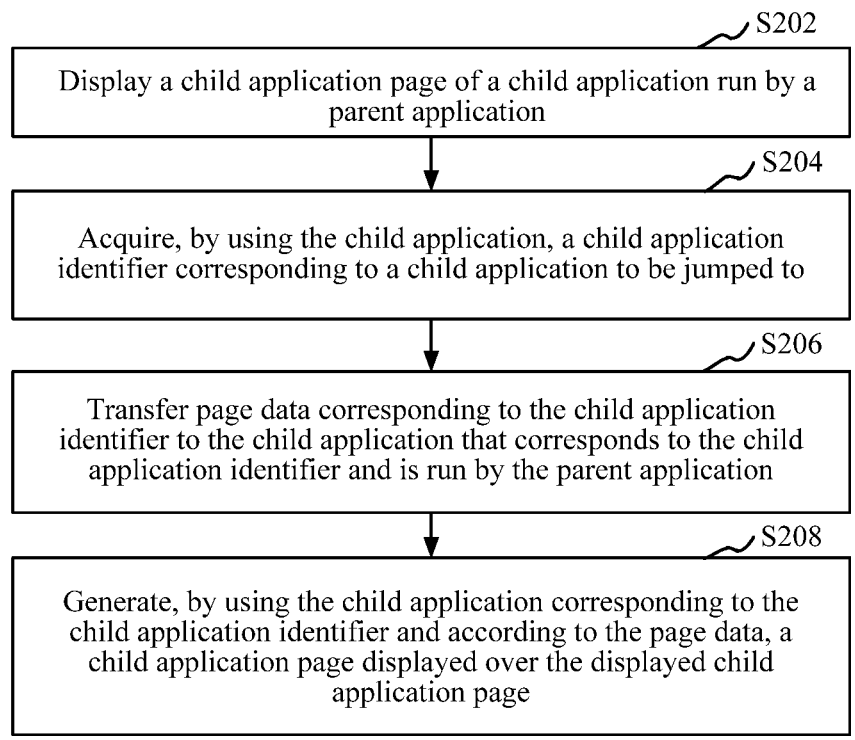
FIG. 2 is a schematic flowchart of an application processing method according to an embodiment of the present application.

FIG. 2 is a schematic flowchart of an application processing method according to an embodiment of the present application. This embodiment is mainly described by using an example in which the method is applied to the terminal 110 in FIG. 1. Referring to FIG. 2, the application processing method specifically includes the following steps:

S202: Display a child application page (or a first child application page) of a child application (or a first child application), where the child application is run by a parent application.

Specifically, an OS runs on a terminal, and the parent application runs on the OS. The OS is a computer program for managing and controlling hardware and software resources of the terminal, and is fundamental system software that directly runs on a bare-metal terminal. The support of the OS is required to run applications. The OS may be a desktop OS such as Windows OS, Linux OS or Mac OS (Apple's desktop OS), or may be a mobile OS such as iOS (Apple's mobile terminal OS) or Android OS.

The parent application is a native application. The native application is an application that can be directly run on the OS. The parent application may be a social networking application, an email application, a game application or the like. The social networking application includes an instant messaging application, a social network service (SNS) application, a live broadcast application or the like. The parent application may be specifically the WeChat program (WeChat).

Figure 3:
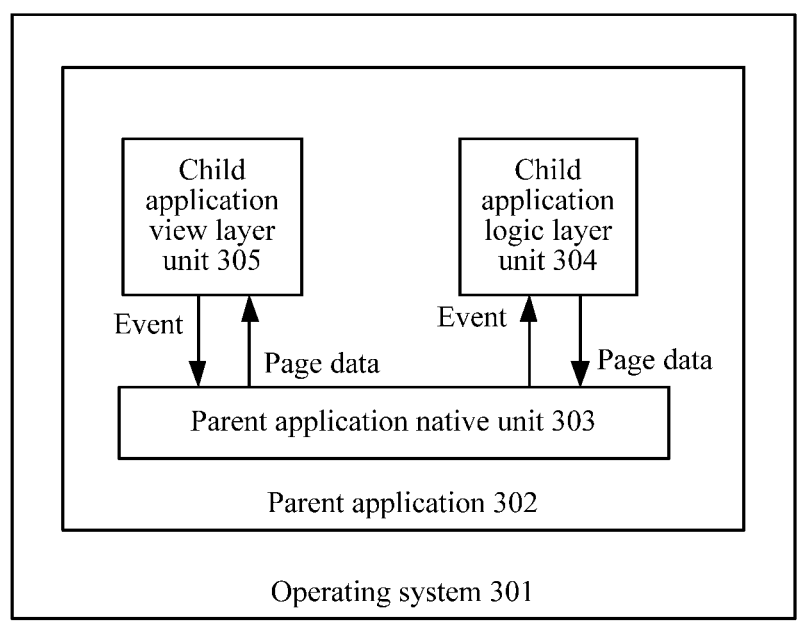
FIG. 3 is a schematic diagram of relationships among an operating system (OS), a parent application, a child application, and a child application page according to an embodiment of the present application.

FIG. 3 is a schematic diagram of relationships among the OS, the parent application, the child application, and the child application page according to an embodiment of the present application. Referring to FIG. 3, an OS 301 runs on a terminal, and a parent application 302 runs on the OS 301. The parent application 302 provides an environment for running of the child application. The terminal may create, according to a program package of the child application, a child application logic layer unit 304 and a corresponding child application view layer unit 305 for implementing the child application. The child application logic layer unit 304 may be configured to execute page logic code in the program package. The child application view layer unit 305 may be configured to execute page structure code in the program package, and may further execute page style code in the program package. The page logic code, the page structure code, and the page style code in the program package may be generally referred to as page code.

In an embodiment, the terminal creates the child application logic layer unit 304 and the corresponding child application view layer unit 305 by using the parent application when the child application is to be run in an environment provided by the parent application. The terminal may then use the parent application 302 to acquire the program package corresponding to the child application and page data corresponding to the child application, so as to acquire the page code from the program package. The page code may include the page logic code, the page structure code, and the page style code.

The terminal may then execute the page structure code by using the child application view layer unit 305, select, from a common component library according to an identifier of a common component defined in the executed page structure code, the common component corresponding to the identifier, acquire default component style data built in the common component, organize the common component according to the default component style data, apply the page data to the common component and perform rendering, and form and present the child application page, so as to display the child application page of the child application run by the parent application.

The page structure code is code for defining page components. The page structure code may include the identifier of the common component included on the page. The page style code is code for defining a page style. The page logic code is code for defining process logic of a corresponding child application page. The common component is a component shared by pages of different child applications, has a visual form, and is a component of the child application page. The common component has a unique identifier, and the identifier may be a name of the common component.

S204: Acquire, by using the child application, a child application identifier (or a second child application identifier) corresponding to a child application (or a second child application) to be jumped to. The parent application can run the second child application when a jump is made from the first child application to the second child application.

The child application identifier is used for uniquely identifying one child application. After each child application is run in the parent application, the parent application may assign a child application identifier (for example, an APP ID) for uniquely identifying each child application to each child application. Each child application may be turned on by using an identifier of the child application. For example, after each child application (for example, a bicycle sharing application, and a coupon application) is run in WeChat, WeChat assigns an APP ID to the child application such as a bicycle sharing function and a coupon function to uniquely recognize the child application such as the bicycle sharing function or the coupon function. A bicycle sharing child application acquires an APP ID of a coupon child application to turn on the coupon child application when it is necessary to jump from the bicycle sharing child application to the coupon child application. The child application identifier may be a character string including characters of at least one type of digit, letter, and symbol, for example, X123456789.

Specifically, the terminal may monitor or listen to, by using a child application (that is, the first child application) of a currently displayed child application page (that is, the first child application page), an event triggered in the currently displayed child application page. The event is used for triggering a jump from the child application to which the currently displayed child application page belongs to another child application (that is, the second child application). The event may be a trigger operation on a jump portal. The jump portal may be specifically an icon, a link, a virtual button or the like. The event may be alternatively an event triggered after a specified event occurs. For example, the event is an event, triggered after a payment method is selected during a payment, of jumping to a child application corresponding to the selected payment method.

The child application identifier (that is, the second child application identifier) corresponding to the child application to be jumped to is acquired when the terminal detects or hears, by using the child application to which the currently displayed child application page belongs, that an event of jumping from the child application to which the currently displayed child application page belongs to another child application is triggered.

In an embodiment, the child application identifier corresponding to the child application to be jumped to may be carried in the jump portal. The child application to which the currently displayed child application page belongs may extract, after detecting the trigger operation on the jump portal, the child application identifier encapsulated in the jump portal. The child application identifier corresponding to the child application to be jumped to may be a child application identifier found, according to the time of detecting or hearing the event, by the child application to which the currently displayed child application page belongs.

S206: Transfer page data corresponding to the child application identifier (or the second child application identifier) to the child application (or the second child application) that corresponds to the child application identifier and is run by the parent application.

The page data is data to be presented on the child application page. The page data may be text data, voice data, video data, image data or the like. The page data may be dynamic data or may be static data. The dynamic data may be continuously changing data or may be periodically changing data.

In an embodiment, the page data corresponding to the child application identifier may be page data included on a page generally chosen for the child application corresponding to the child application identifier. The generally chosen page is, for example, a front page of the child application. The front page of the child application is a page directly displayed after the child application is loaded. The page data corresponding to the child application identifier may be alternatively page data that belongs to a specific page of the child application corresponding to the child application identifier, for example, page data on a page having email content in an email application or page data on a page having weather information in a weather application.

Specifically, the terminal may acquire, by using the parent application, a child application global logic file corresponding to the child application to be jumped to, create the child application logic layer unit according to the child application global logic file, then acquire a child application global configuration file corresponding to the child application identifier, acquire a child application page configuration file specified in the child application global configuration file, and create the child application view layer unit according to the child application page configuration file.

Further, the child application logic layer unit initiates a page data acquisition request for acquiring page data corresponding to the child application to be jumped to. The parent application then acquires, according to the page data acquisition request, the page data corresponding to the child application to be jumped to from a server corresponding to the parent application or a server corresponding to the child application. After acquiring the page data, the parent application transfers the acquired page data to the child application view layer unit.

The terminal may invoke a child application launch interface provided by the parent application to create the child application logic layer unit and the child application view layer unit corresponding to the child application to be jumped to or may switch to a parent application page used for triggering a child application jump, so as to trigger creation of the child application logic layer unit and the child application view layer unit corresponding to the child application to be jumped to. The child application launch interface may be specifically launch JSAPI or the like.

In an embodiment, the terminal may further send, by using the parent application, the page data acquisition request to the server corresponding to the parent application, so that the server corresponding to the parent application acquires, from the server corresponding to the child application to be jumped to, the page data corresponding to the child application to be jumped to.

In an embodiment, by using child applications, the terminal acquires the child application identifier corresponding to the child application to be jumped to, and acquires a child application identifier corresponding to the currently displayed child application page. The terminal then sends the two child application identifiers and a child application jumping relationship (e.g., a redirect event that includes an application before the jump and another application after the jump) to the server. The server detects whether the received child application jumping relationship is allowed. Default page data is returned if the received child application jumping relationship is forbidden.

Herein, the parent application (for example, WeChat) or the server (for example, a WeChat server) corresponding to the parent application may examine a child application list (the list includes child applications to which a jump from a child application A is permitted) for a jump from the child application A and a child application list (the list includes child applications to which a jump from a child application B is permitted) for a jump from the child application B when it is necessary to jump from the child application A to the child application B (that is, the jumping relationship is A→B). The jumping relationship A→B is valid if a jump from the child application A to the child application B is permitted and a jump from the child application B to the child application A is permitted. Otherwise, the jumping relationship A→B is forbidden. That is, a jump from the child application A to the child application B is not allowed.

It is then detected whether the child application to be jumped to is effective if the received child application jumping relationship is allowed. The page data corresponding to the child application to be jumped to is returned if the child application to be jumped to is effective. The default page data is returned.

For example, the parent application sends a jumping relationship of jumping from A to B and child application identifiers of A and B to the server if it is intended to jump from the child application A running in the parent application to the child application B. The server detects whether a jump from A to B is allowed. The default page data is returned if the jump is not allowed. It is then detected whether B is effective if the jump is allowed. Page data corresponding to B is returned if B is effective. The default page data is returned if B is ineffective.

In an embodiment, the page data corresponding to the child application identifier includes data transferred by the child application corresponding to the currently displayed child application page. The data transferred by the child application corresponding to the currently displayed child application page may be a page path and a page parameter of the child application to be jumped to or may be data that can be filled on the child application page of the child application to be jumped to.

In an embodiment, after acquiring, by using the child application, the child application identifier corresponding to the child application to be jumped to, the terminal may detect whether a code package corresponding to the child application identifier is locally stored. Page data on a default loaded page is acquired if a locally stored code package corresponding to the child application identifier is not detected, the default loaded page is generated and displayed over the displayed child application page, and a code package is downloaded from the server corresponding to the child application identifier, and code in the code package is executed to run the corresponding child application.

S208: Generate, according to the page data, a child application page (that is, a second child application page) displayed over the displayed child application page (that is, the first child application page).

Specifically, the terminal may execute, by using the child application view layer unit corresponding to the child application identifier, the page structure code corresponding to the child application identifier, select, from a common component library according to an identifier of a common component defined in the executed page structure code, the common component corresponding to the identifier, acquire default component style data built in the common component, organize the common component according to the default component style data, apply the page data to the common component and perform rendering, and generate the child application page displayed over the displayed child application page.

In an embodiment, the terminal may display, over the displayed child application page by using the parent application, the child application page generated by the child application view layer unit corresponding to the child application identifier according to the page data.

In an embodiment, the child application page generated by the child application view layer unit corresponding to the child application identifier according to the page data may be alternatively automatically displayed over the displayed child application page.

In the foregoing application processing method, a parent application runs on the OS, a child application may be run by the parent application, and a child application page that belongs to the child application is displayed. The parent application only needs to acquire, by using the child application, a child application identifier corresponding to a child application to be jumped to before the parent application can transfer page data corresponding to the child application identifier to the child application that corresponds to the child application identifier and is run by the parent application when it is necessary to make a child application jump, and the child application corresponding to the child application identifier may then generate, according to the page data, a child application page displayed over the displayed child application page, so as to automatically implement the child application jump. The time required to exit a currently used application and then start an intended application to be jumped to is avoided, and application use efficiency is improved.

By using the foregoing technical solution, child applications may implement complementary functions. That is, the child applications may constitute a collaborative environment. For example, some child applications focus on platform functions (for example, a job-search platform function) and specialized functions (for example, a coupon function) to provide services to other child applications. Some other child applications focus on business functions (for example, a bicycle sharing function). In this way, child applications can be developed faster at lower costs, and the child applications become more intensive and extensive (for example, the child applications implement complementary functions to grow more powerful, and therefore more intensive functions are fulfilled; and with the foregoing jump function, a jump may be made from one child application to other child applications, so that more extensive functions are fulfilled). For example, WeChat (the parent application) has a coupon management child application that provides a function of managing membership cards. A jump may be made from other child applications that need to use a membership card to a coupon application (child application) in the foregoing child application jump manner, so as to implement membership card management such as membership registration and score management. In this way, other child applications can conveniently integrate a membership card function without expending corresponding labor and resources.

In an embodiment, after S204, the application processing method further includes: acquiring a jump path used for recording one or more existing child application jumping relationships; moving the acquired child application identifier to the end of the jump path when the acquired child application identifier exists in the jump path; and adding the acquired child application identifier to the end of the jump path when the acquired child application identifier does not exist in the jump path.

The jump path includes child application identifiers arranged in a child application jump sequence, and records the child application jumping relationship. In other words, the jump path including one or more child application identifiers arranged in a specific sequence based on one or more previous jumps. For example, the jump path in the child application jumping relationship recording "jumping from the child application A to the child application B and then to a child application C" is: A→B→C.

Specifically, the terminal may acquire, by using the parent application, the jump path used for recording one or more existing/historical child application jumping relationships, traverse child application identifiers in the acquired jump path, and compare a traversed-to child application identifier with the acquired child application identifier. The traversed-to child application identifier is moved to the end of the jump path when the parent application determines that the traversed-to child application identifier is the same as the acquired child application identifier. The acquired child application identifier is directly added to the end of the jump path when the parent application determines that no traversed-to child application identifier is the same as the acquired child application identifier.

For example, it is assumed that the jump path acquired by the terminal by using the parent application is "A→B→C". If it is currently intended to jump from a child application corresponding to C to a child application corresponding to B, in this case, B exists in "A→B→C", B is moved to the end of "A→B→C" to obtain "A→C→B". If it is currently intended to jump from the child application corresponding to C to a child application corresponding to D, in this case, D does not exist in "A→B→C", D is directly added to the end of "A→B→C" to obtain "A→B→C→D".

In an embodiment, the terminal may detect, by using the parent application, whether the child application with the acquired child application identifier is currently run in an environment provided by the parent application when the acquired child application identifier exists in the jump path; and, search for a page path that exists when the child application with the acquired child application identifier is run if the child application is currently run. It is not necessary to first close the child application if the page path that exists when the child application is run is not consistent with a page path of a page of a currently intended child application to be jumped to, and the page of the currently intended child application to be jumped to may be generated by invoking a reload interface. The reload interface may be specifically Relaunch JSAPI or the like.

In some embodiments, the child application jumping relationship is recorded, so as to return to accessed child applications sequentially during a child application jump in an environment provided by the parent application.

In an embodiment, the application processing method further includes: acquiring a return instruction by using a child application to which a currently displayed child application page belongs (i.e., the return instruction is received while displaying the child application page or is from the child application); in response to the return instruction, determining the child application identifier corresponding to the currently displayed child application page; searching the jump path for a child application identifier that is adjacent to the determined child application identifier and is located before the determined child application identifier; and returning to the child application page corresponding to the found child application identifier.

The return instruction is an instruction used for returning to a previous child application (that is, a third child application, where the third child application may be the same as or different from the first child application). The return instruction may be a passively triggered instruction or an actively triggered instruction. The passively triggered instruction is a return instruction passively triggered after the child application to which the currently displayed child application page belongs detects a trigger event. The actively triggered instruction is a return instruction actively triggered by the child application to which the currently displayed child application page belongs.

In an embodiment, the terminal may monitor or listen to, by using the child application to which the currently displayed child application page belongs, an event triggered in the currently displayed child application page. The event is used for triggering a return from the child application to which the currently displayed child application page belongs to a previously started child application (that is, the third child application). The event may be a trigger operation on an operation portal such as an icon or a virtual button. The trigger operation may be a touch operation, a click operation (for example, a click operation on the control 400 in FIG. 4) or a swipe operation (for example, a left-to-right swipe operation on the page shown in FIG. 4) and the like.

In an embodiment, the terminal may automatically trigger a return instruction after the child application to which the currently displayed child application page belongs finishes performing a specific operation. For example, the child application to which the currently displayed child application page belongs is a payment child application. In this case, after the payment child application finishes a payment, a return instruction for returning to a previous child application is automatically triggered. The return instruction may be automatically triggered by invoking a return interface provided by the parent application. The return interface may be specifically Back JSAPI or the like.

In an example, when making a child application return according to a return instruction, the terminal may acquire data that needs to be transferred by a current child application from which the return is made to the child application to be returned to, and then transfer the acquired data to the child application to be returned to. Generally, data is transferred in all returns triggered by invoking the return interface provided by the parent application.

Specifically, after acquiring the return instruction by using the child application to which the currently displayed child application page belongs, the terminal determines, in response to the return instruction, the child application identifier corresponding to the currently displayed child application page, then searches the jump path for the child application identifier that is adjacent to the determined child application identifier and is located before the determined child application identifier, and returns to the child application page corresponding to the found child application identifier.

In an embodiment, the returning to the child application page corresponding to the found child application identifier includes: returning to a child application page displayed during a jump by the child application corresponding to the found child application identifier when the child application corresponding to the found child application identifier is run by the parent application in a background state (e.g., most recent jump recorded in the jump path is from child application A to child application B, and when that jump occurred, child application A was left off at page A and made to run in the background. The user terminal is currently displaying page B of child application B, and when a return instruction is received, the user terminal may return to page A of child application A); and returning to a default child application page corresponding to the found child application identifier when the child application corresponding to the found child application identifier has finished running.

When being run by the parent application in a background state, the child application is run by the parent application but is not displayed on a page by using a view layer. A foreground state is a concept corresponding to the background state. When being run by the parent application in a foreground state, the child application is run by the parent application and is displayed on a page by using the view layer. After a jump is made from one child application to another child application, the child application from which the jump is made is not closed but continues to be run by the parent application in a background state until the child application running in a background state is manually closed or is closed by the parent application because running times out. For example, the child application is closed when being run in the background over ten minutes.

Specifically, after determining, by using the parent application, the child application to be returned to, the terminal may search a child application running management list for the child application identifier corresponding to the child application to be returned to. If the child application identifier corresponding to the child application to be returned to is found in the child application running management list, it indicates that the child application to be returned to is run by the parent application in a background state. The terminal may switch, by using the parent application, the child application to be returned to a foreground state for running, and display a child application page displayed by the child application to be returned to during a jump.

If the child application identifier corresponding to the child application to be returned to is not found in the child application running management list, it indicates that the child application to be returned to has finished running. The terminal may acquire, by using the parent application, page data of the default child application page corresponding to the child application to be returned to, so as to display the default child application page corresponding to the child application to be returned to. For example, the parent application relaunch (or start) the child application and display a front page or the like of the child application.

In some embodiments, the child application may be switched to the foreground for running to swiftly return to a page displayed by the child application to be returned to during the jump when the child application to be returned to is still run in the background, so that a user may continue to operate on the page, thereby improving application convenience. In addition, the default child application page of the child application to be returned to is directly returned to in the parent application when the child application to be returned to has finished running, so that the time for manual switching is avoided, and application use efficiency is improved.

In the foregoing embodiments, a processing manner of jumping from a child application and then returning to the child application is provided, so that a return may be directly made in the parent application when it is intended to return to a used child application, the time required to exit a currently used application and then start an intended application to be returned to is avoided, and application use efficiency is improved.

Figure 4:
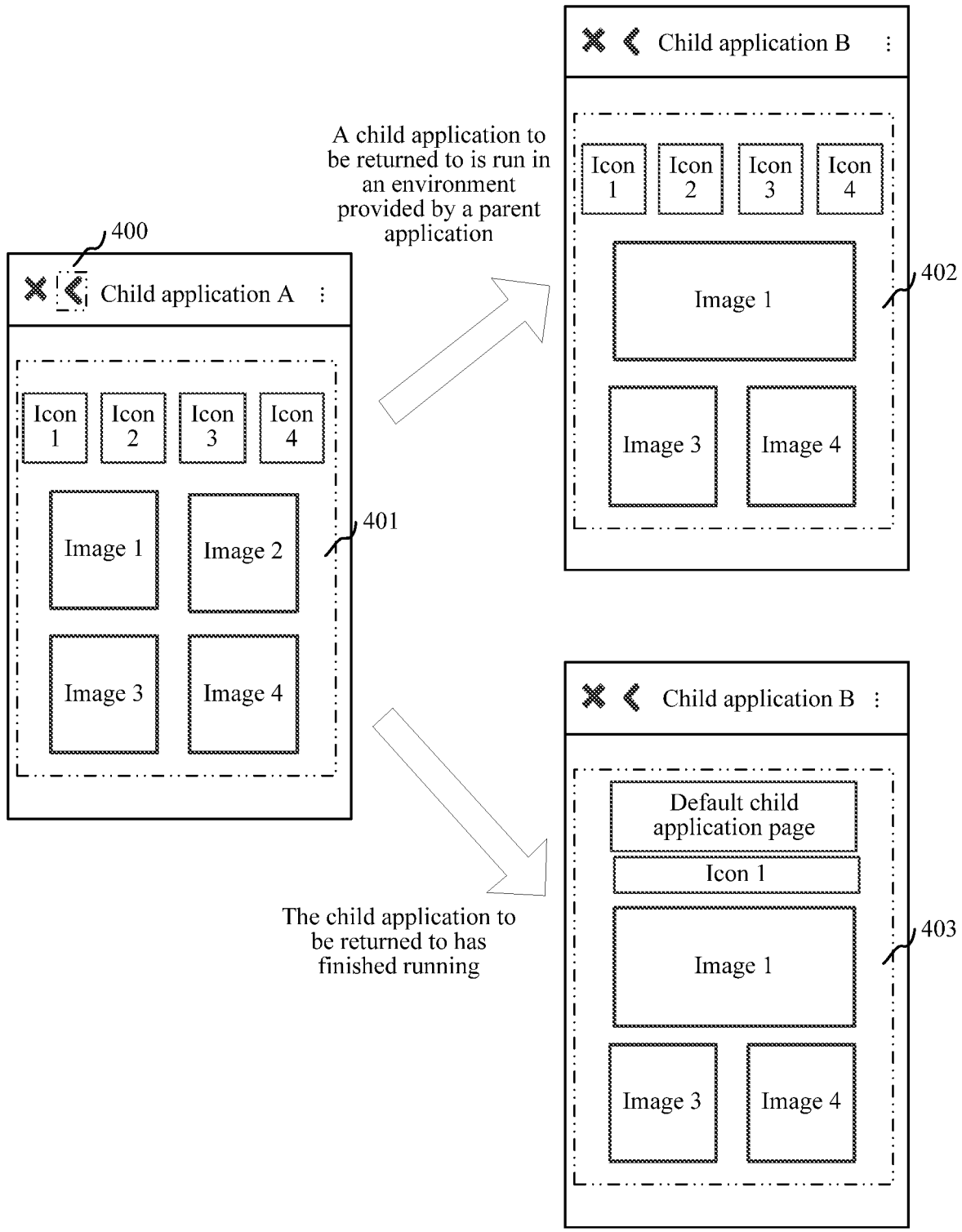
FIG. 4 is a schematic diagram of returning to a child application according to an embodiment of the present application.

FIG. 4 is a schematic diagram of returning to a child application according to an embodiment. Referring to FIG. 4, the schematic diagram includes a return operation portal 400, a currently displayed child application page 401, a child application page 402 displayed by the child application to be returned to during a jump, and a default child application page 403 of the child application to be returned to. The child application page 402 displayed by the child application to be returned to during a jump is displayed over the currently displayed child application page 401 when the terminal determines, by using the parent application after detecting the trigger operation on the return operation portal 400, that the child application to be returned to is run by the parent application in a background state. The default child application page 403 of the child application to be returned to is displayed over the currently displayed child application page 401 when the terminal determines, by using the parent application, that the child application to be returned to has finished running.

In an embodiment, the child application includes a native plug-in child application, and the moving the acquired child application identifier to the end of the jump path when the acquired child application identifier exists in the jump path includes: determining a consecutive native plug-in child application identifier (i.e., determining a native plug-in child application identifier, and such chain may include one or more consecutively arranged native plug-in child application identifiers) that is adjacent to the acquired child application identifier in the jump path and is located after the acquired child application identifier when the acquired child application identifier exists in the jump path; and moving the acquired child application identifier to the end of the jump path, and deleting the consecutive native plug-in child application identifier (i.e., all consecutive native plug-in child application identifier in the chain) in the jump path.

The native plug-in child application is a child application that is developed by a developer of the parent application and is configured to implement a plug-in function such as a "Nearby Portal" child application or a "Scan QR Code" child application of the parent application. The native plug-in child application and the parent application may be considered as a whole when the native plug-in child application is run in the parent application. The native plug-in child application and an intended child application to be jumped to may be considered as a whole when a jump is made from a child application to the native plug-in child application.

Specifically, the terminal may acquire, by using the parent application, the jump path used for recording one or more existing child application jumping relationships, traverse child application identifiers in the acquired jump path, and compare a traversed-to child application identifier with the acquired child application identifier. The parent application detects whether a next child application identifier of the traversed-to child application identifier is a native plug-in child application identifier when determining that the traversed-to child application identifier is the same as the acquired child application identifier.

The consecutive native plug-in child application identifier of the native plug-in child application identifier is determined if the parent application determines that the next child application identifier of the traversed-to child application identifier in the jump path is a native plug-in child application identifier, the acquired child application identifier is then moved to the end of the jump path, and the consecutive native plug-in child application identifier is deleted in the jump path. The acquired child application identifier is directly moved to the end of the jump path if the parent application determines that the next child application identifier of the traversed-to child application identifier in the jump path is not a native plug-in child application identifier.

That is, the native plug-in child application is configured to implement a function of the parent application or a child application. An adjacent and consecutive native plug-in child application identifier after the child application identifier is also deleted when a position of a child application identifier needs to be moved.

For example, it is assumed that the jump path acquired by the terminal by using the parent application is "A→B→K1→K2→C", where K1 and K2 are native plug-in child application identifiers. If it is currently intended to jump from the child application corresponding to C to the child application corresponding to B, in this case, B exists in "A→B→K1→K2→C", and a next child application identifier of B is K1 and is a native plug-in child application identifier. It is determined that consecutive native plug-in child application identifiers after B are "K1→K2", so that B is moved to the end of "A→B→K1→K2→C", and "K1→K2" are deleted to obtain "A→C→B".

If it is currently intended to jump from the child application corresponding to C to a native plug-in child application corresponding to K1, in this case, K1 exists in "A→B→K1→K2→C", and a next child application identifier of K1 is K2 and is a native plug-in child application identifier. It is determined that the consecutive native plug-in child application identifier after K1 is "K2", so that K1 is moved to the end of "A→B→K1→K2→C", and "K2" is deleted to obtain "A→B→C→K1".

If it is currently intended to jump from the child application corresponding to C to a native plug-in child application corresponding to K2, in this case, K2 exists in "A→B→K1→K2→C", and a next child application identifier of K2 is C and is not a native plug-in child application identifier. K2 is directly moved to the end of "A→B→K1→K2→C" to obtain "A→B→K1→C→K2".

In some embodiments, the native plug-in child application that may be used as a child application component is provided, so that use experience basically consistent with that of directly using a child application may be achieved when a jump is made from the child application to the native plug-in child application, so that a process of developing a child application is avoided, and efficiency of implementing a child application is improved.

In an embodiment, the child application further includes a third-party child application, and the application processing method further includes: monitoring a close instruction by using the child application to which a currently displayed child application page belongs; returning to the native plug-in child application corresponding to a native plug-in child application identifier when a close instruction is detected and the native plug-in child application identifier (that is, a first native plug-in child application identifier) exists before a foremost third-party child application identifier in the jump path; and returning to the parent application when a close instruction is detected and a native plug-in child application identifier does not exist before the foremost third-party child application identifier in the jump path.

The third-party child application is a child application developed by a third-party service provider registered on an open service platform corresponding to the parent application. The close instruction is an instruction used for closing a child application and return to the parent application or the native plug-in child application.

For example, the parent application is WeChat, and the third-party child application is a bicycle sharing application, an XXXX shopping application or the like. The user may scan a two-dimensional barcode, search for a name (for example, Mobike) of the third-party child application, click a message or a contact card shared by another user or perform another operation in WeChat to download and run the third-party child application, so as to use a service provided by the third-party child application. The third-party child application seamlessly accesses the parent application and is referred to as a part of the parent application, so that the user has native experience and the third-party child application has fully extended functions of the parent application. For example, Mobike may be used in WeChat to use a shared bicycle or the XXXX shopping application may be used in WeChat to do shopping.

In an embodiment, the terminal may monitor or listen to, by using the child application to which the currently displayed child application page belongs, an event triggered in the currently displayed child application page. The event is used for triggering closing of a child application and returning to the parent application or the native plug-in child application. The event may be a trigger operation on an operation portal such as an icon (for example, the control 500 in FIG. 5) or a virtual button. The jump path becomes invalid when an event used for triggering closing of a child application is detected or heard. For example, the jump path is A→B→C, and the child application C is currently displayed. The jump path A→B→C becomes invalid when it is detected that the user operates the control 500 in FIG. 5 (that is, closes the child application C), and a return is made to the parent application.

Specifically, after detecting or hearing a close instruction by using the child application to which the currently displayed child application page belongs, the terminal searches the jump path by using the parent application to determine whether a native plug-in child application identifier exists before the first third-party child application identifier; and returns to a native plug-in child application corresponding to a native plug-in child application identifier if the native plug-in child application identifier exists before the foremost third-party child application identifier in the jump path, or returns to the parent application if a native plug-in child application identifier does not exist before the foremost third-party child application identifier in the jump path.

In an embodiment, the returning to a native plug-in child application corresponding to a native plug-in child application identifier includes: acquiring a native plug-in child application identifier (that is, a second native plug-in child application identifier) that is adjacent to the first third-party child application identifier and is located before the first third-party child application identifier when more than one native plug-in child application identifier exists before the foremost third-party child application identifier in the jump path; determining a native plug-in child application page displayed during a jump by a native plug-in child application corresponding to the acquired native plug-in child application identifier; and displaying the determined native plug-in child application page.

Specifically, when finding, by using the parent application, that a native plug-in child application identifier exists before the foremost third-party child application identifier in the jump path, the terminal determines whether more than one native plug-in child application identifier exists before the foremost third-party child application identifier in the jump path. If determining, by using the parent application, that there is only one native plug-in child application identifier, the terminal displays the native plug-in child application page displayed during a jump by a native plug-in child application corresponding to the unique native plug-in child application identifier.

If determining, by using the parent application, that there is more than one native plug-in child application identifier, the terminal acquires a native plug-in child application identifier that is adjacent to the first third-party child application identifier and is located before the first third-party child application identifier; determines the native plug-in child application page displayed during a jump by the native plug-in child application corresponding to the acquired native plug-in child application identifier; and displays the determined native plug-in child application page.

In some embodiments, because the native plug-in child application is configured to implement a function of the parent application and the native plug-in child application and the parent application are considered as a whole, a direct return is made to the parent application or the native plug-in child application when it is intended to close a running third-party child application, and indirect control using the third-party child application is not required, so that application use efficiency is improved.

In the foregoing embodiment, it is only necessary to trigger a close instruction to directly return to the parent application or the native plug-in child application when the child application jump is completed and it is intended to close a running third-party child application, so that the time required to close third-party child applications one by one is avoided, and application use efficiency is improved.

Figure 5:
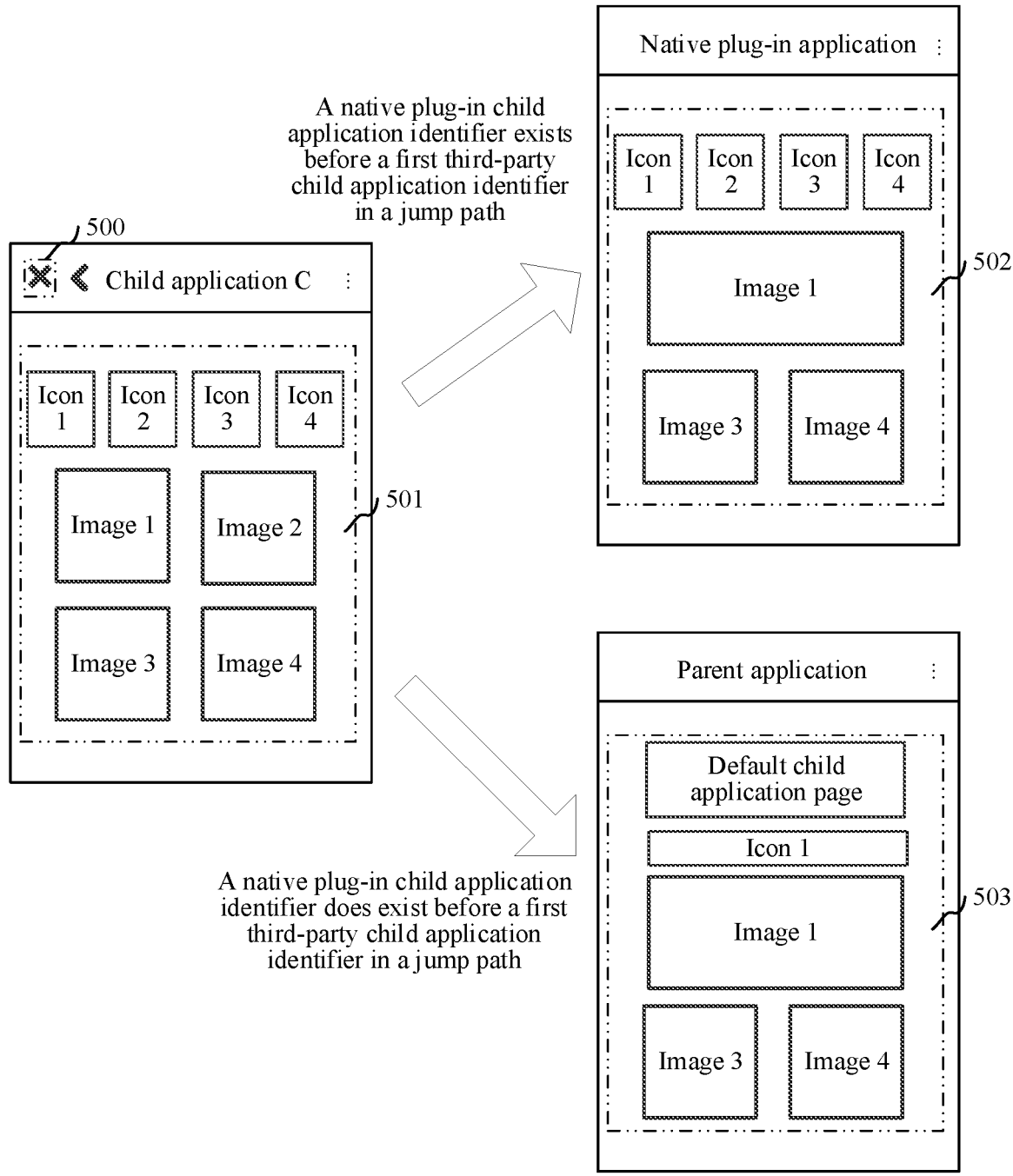
FIG. 5 is a schematic diagram of closing a child application according to an embodiment of the present application.

FIG. 5 is a schematic diagram of closing a child application according to an embodiment. Referring to FIG. 5, the schematic diagram includes a close trigger portal 500, a currently displayed child application page 501, a native plug-in child application page 502 displayed during a jump by a native plug-in child application corresponding to a native plug-in child application identifier that is adjacent to the first third-party child application identifier in the jump path and is located before the first third-party child application identifier, and a parent application page 503 displayed by the parent application when running a child application.

After detecting the trigger operation on the close trigger portal 500 on the currently displayed child application page 501 and detecting, by using the parent application, that a native plug-in child application identifier exists before the first third-party child application identifier in the jump path, the terminal returns to, according to the close instruction, the native plug-in child application page 502 displayed during a jump by the native plug-in child application corresponding to the native plug-in child application identifier that is adjacent to the first third-party child application identifier in the jump path and is located before the first third-party child application identifier. When detecting, by using the parent application, that a native plug-in child application identifier does not exist before the first third-party child application identifier in the jump path, the terminal returns to the parent application page 503 displayed by the parent application when running the child application.

In an embodiment, the transferring page data corresponding to the child application identifier to the child application that corresponds to the child application identifier and is run by the parent application includes: switching to the parent application page used for triggering a child application jump, where the parent application page is a page displayed by the parent application; triggering, by using the parent application page, acquisition of page data corresponding to the child application identifier; and transferring the page data to the child application that corresponds to the child application identifier and is run by the parent application.

Specifically, the parent application page is used for triggering the child application jump. That is, it is necessary to first switch to the parent application page and the parent application page is then used for triggering acquisition of the page data corresponding to the child application identifier when it is intended to jump from a child application to another child application. The page data is then transferred to the child application that corresponds to the child application identifier and is run by the parent application.

The parent application page used for triggering a child application jump may be a universal parent application page. By using the universal parent application page, it may be triggered to start to jump to any child application. The parent application page used for triggering a child application jump may be alternatively parent application pages that correspond to child applications one by one. Each child application has one corresponding parent application page used for starting the child application.

In some embodiments, a switch is made to the parent application page used for triggering a child application jump to implement a child application jump, thereby providing a new way for a child application jump.

Figure 6:
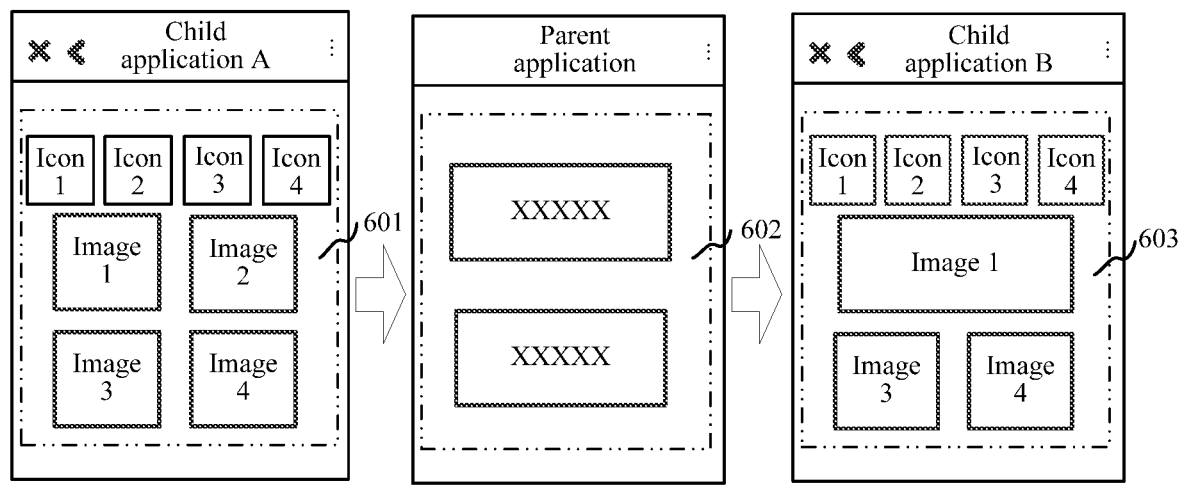
FIG. 6 is a schematic diagram of jumping to a child application according to an embodiment of the present application.

FIG. 6 is a schematic diagram of jumping to a child application according to an embodiment. Referring to FIG. 6, the schematic diagram includes a currently displayed child application page 601, a parent application page 602 used for triggering a child application jump, and a child application page 603 corresponding to a child application to be jumped to. The terminal switches from the child application page 601 currently displayed in a current child application to the parent application page 602 used for triggering a child application jump and then triggers a jump to the child application page 603 corresponding to the child application to be jumped to, thereby implementing a child application jump.

In an embodiment, after S204, the application processing method further includes: acquiring a parent application page identifier (that is, a first parent application page identifier) corresponding to a switched-to parent application page (that is, a first parent application page) and a jump path used for recording one or more existing child application jumping relationships; deleting a parent application page identifier (that is, a second parent application page identifier) that is adjacent to the acquired child application identifier in the jump path and is located after the acquired child application identifier when the acquired child application identifier exists in the jump path; and adding the acquired parent application page identifier to the end of the jump path; and moving the child application identifier acquired in the jump path after the added parent application page identifier.

The jump path includes child application identifiers and/or parent application page identifiers arranged in a child application jump sequence, records a child application jumping relationship, and reflects a child application jump manner. For example, the jump path recording the child application jumping relationship of "switching from the child application A to a parent application page M to jump to the child application C" is: A→M→C.

Specifically, the terminal may acquire, by using the parent application, the jump path used for recording one or more existing child application jumping relationships, traverse child application identifiers in the acquired jump path, and compare a traversed-to child application identifier with the acquired child application identifier. When determining that the traversed-to child application identifier is the same as the acquired child application identifier, the parent application deletes an adjacent parent application page identifier after the traversed-to child application identifier, adds the parent application page identifier corresponding to the switched-to parent application page after the end of the jump path, and moves the traversed-to child application identifier after the added parent application page identifier.

When determining that no traversed-to child application identifier is the same as the acquired child application identifier, the parent application directly adds the parent application page identifier corresponding to the switched-to parent application page and the acquired child application identifier in sequence to the end of the jump path.

For example, it is assumed that the jump path acquired by the terminal by using the parent application is "A→M1→B→C". If it is currently intended to jump from the child application corresponding to C to a child application corresponding to A via a parent application page M2, in this case, A exists in "A→M1→B→C". An adjacent parent application page M1 after A is deleted. After M2 is added after the end of "A→B→C" and A is moved after M2, "B→C→M2→A" is obtained.

In some embodiments, during a child application jump in an environment provided by the parent application, the child application jumping relationship reflecting the child application jump manner is recorded, so as to return to accessed child applications or parent application pages sequentially.

In other embodiments, a parent application page identifier of a parent application page and a child application identifier of a jumped-to child application are both recorded in a jump path when a jump from a child application to another child application is triggered by a switch to the parent application page. No data is transferred when a child application return is triggered by invoking the return interface provided by the parent application. If a current child application that needs to be returned to, that is, the child application to be returned to determined according to the jump path, is not a source child application for jumping to the current child application that needs to be returned to, no data is transferred either when a child application return is triggered by invoking the return interface provided by the parent application.

Figure 7:
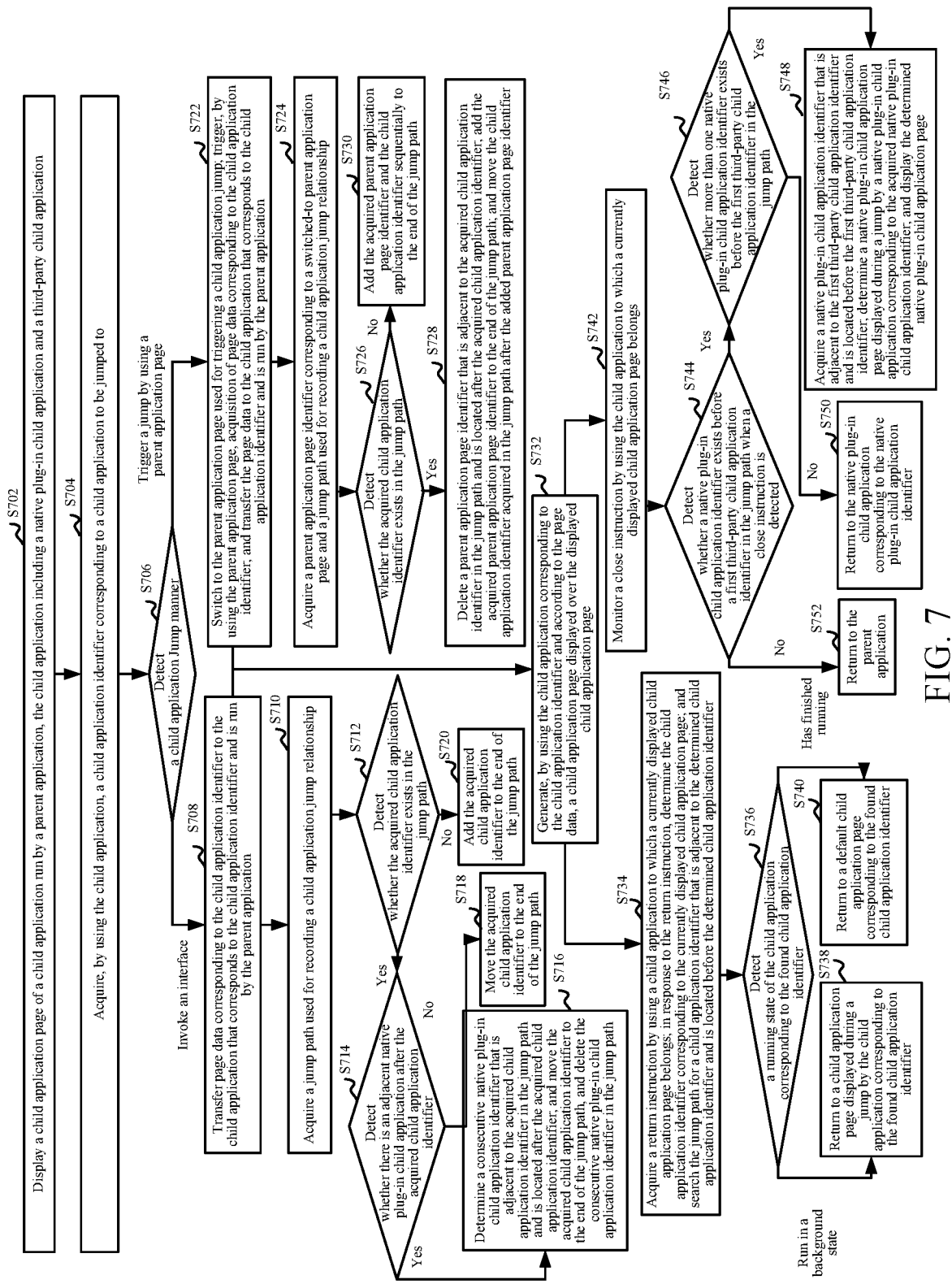
FIG. 7 is a schematic flowchart of an application processing method according to another embodiment of the present application.

FIG. 7 is a schematic flowchart of an application processing method according to a specific embodiment. Referring to FIG. 7, the application processing method specifically includes the following steps:

S702: Display a child application page of a child application run by a parent application, the child application including a native plug-in child application and a third-party child application.

S704: Acquire, by using the child application, a child application identifier (for example, an APP ID) corresponding to a child application to be jumped to.

S706: Detect a child application jump manner, perform step S708 if the child application jump manner is a jump by invoking an interface (for example, launch JSAPI) provided by the parent application; and perform step S722 if the child application jump manner is a jump triggered by using a parent application page.

S708: Transfer page data corresponding to the child application identifier to the child application that corresponds to the child application identifier and is run by the parent application.

S710: Acquire a jump path used for recording one or more existing child application jumping relationships.

S712: Detect whether the acquired child application identifier exists in the jump path; and perform step S714 if yes; or perform step S720 if not.

S714: Detect whether there is an adjacent native plug-in child application after the acquired child application identifier; and perform step S716 if yes; or perform step S718 if not.

S716: Determine a consecutive native plug-in child application identifier that is adjacent to the acquired child application identifier in the jump path and is located after the acquired child application identifier; and move the acquired child application identifier to the end of the jump path, and delete the consecutive native plug-in child application identifier in the jump path.

S718: Move the acquired child application identifier to the end of the jump path.

S720: Add the acquired child application identifier to the end of the jump path.

S722: Switch to the parent application page used for triggering a child application jump; trigger, by using the parent application page, acquisition of page data corresponding to the child application identifier; and transfer the page data to the child application that corresponds to the child application identifier and is run by the parent application.

S724: Acquire a parent application page identifier corresponding to a switched-to parent application page and a jump path used for recording one or more existing child application jumping relationships.

S726: Detect whether the acquired child application identifier exists in the jump path; and perform step S728 if yes; or perform step S730 if not.

S728: Delete a parent application page identifier that is adjacent to the acquired child application identifier in the jump path and is located after the acquired child application identifier; add the acquired parent application page identifier to the end of the jump path; and move the child application identifier acquired in the jump path after the added parent application page identifier.

S730: Add the acquired parent application page identifier and the child application identifier sequentially to the end of the jump path.

S732: Generate, by using the child application corresponding to the child application identifier and according to the page data, a child application page displayed over the displayed child application page.

S734: Acquire a return instruction by using a child application to which a currently displayed child application page belongs; in response to the return instruction, determine the child application identifier corresponding to the currently displayed child application page; and search the jump path for a child application identifier that is adjacent to the determined child application identifier and is located before the determined child application identifier.

S736: Detect a running state of the child application corresponding to the found child application identifier; perform step S738 if the child application corresponding to the found child application identifier is run by the parent application in a background state; and perform step S740 if the child application corresponding to the found child application identifier has finished running.

S738: Return to a child application page displayed during a jump by the child application corresponding to the found child application identifier.

S740: Return to a default child application page corresponding to the found child application identifier.

S742: Monitor a close instruction by using the child application to which a currently displayed child application page belongs.

S744: Detect whether a native plug-in child application identifier exists before a first third-party child application identifier in the jump path when a close instruction is detected; and perform step S746 if yes; or perform step S752 if not.

S746: Detect whether more than one native plug-in child application identifier exists before the first third-party child application identifier in the jump path; and perform step S748 if yes; or perform step S750 if not.

S748: Acquire a native plug-in child application identifier that is adjacent to the first third-party child application identifier and is located before the first third-party child application identifier; determine a native plug-in child application page displayed during a jump by a native plug-in child application corresponding to the acquired native plug-in child application identifier; and display the determined native plug-in child application page.

S750: Return to the native plug-in child application corresponding to the native plug-in child application identifier.

S752: Return to the parent application.

In some embodiments, the parent application runs on the OS, a child application may be run by the parent application, and a child application page that belongs to the child application is displayed. The parent application only needs to acquire, by using the child application, a child application identifier corresponding to a child application to be jumped to before the parent application can transfer page data corresponding to the child application identifier to the child application that corresponds to the child application identifier and is run by the parent application when it is necessary to make a child application jump, and the child application corresponding to the child application identifier may then generate, according to the page data, a child application page displayed over the displayed child application page, so as to automatically implement the child application jump. The time required to exit a currently used application and then start an intended application to be jumped to is avoided, and application use efficiency is improved.

In addition, a processing manner of jumping from a child application and then returning to the child application is provided, so that a return may be directly made in the parent application when it is intended to return to a used child application, the time required to exit a currently used application and then start an intended application to be returned to is avoided, and application use efficiency is improved. It is only necessary to trigger a close instruction to directly return to the parent application or the native plug-in child application when the child application jump is completed and it is intended to close a running third-party child application, so that the time required to close third-party child applications one by one is avoided, and application use efficiency is improved.

Figure 8:
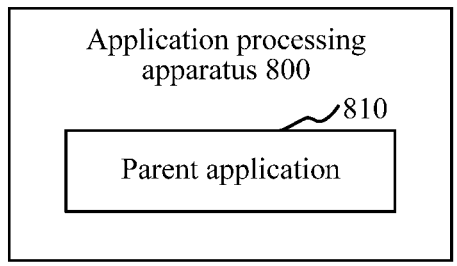
FIG. 8 is a structural block diagram of an application processing apparatus according to an embodiment of the present application.

As shown in FIG. 8, in an embodiment, an application processing apparatus 800 is provided. Referring to FIG. 8, the application processing apparatus 800 includes a parent application 810.

The parent application 810 is configured to: display a child application page of a running child application; acquire, by using the child application, a child application identifier corresponding to a child application to be jumped to; transfer page data corresponding to the child application identifier to the child application that corresponds to the child application identifier and is run by the parent application; and generate, by using the child application corresponding to the child application identifier and according to the page data, a child application page displayed over the displayed child application page.

For the foregoing application processing apparatus 800, the parent application runs on the OS, a child application may be run by the parent application, and a child application page that belongs to the child application is displayed. The parent application only needs to acquire, by using the child application, a child application identifier corresponding to a child application to be jumped to before the parent application can transfer page data corresponding to the child application identifier to the child application that corresponds to the child application identifier and is run by the parent application when it is necessary to make a child application jump, and the child application corresponding to the child application identifier may then generate, according to the page data, a child application page displayed over the displayed child application page, so as to automatically implement the child application jump. The time required to exit a currently used application and then start an intended application to be jumped to is avoided, and application use efficiency is improved.

In an embodiment, the parent application 810 is further configured to acquire a jump path used for recording one or more existing child application jumping relationships; move the acquired child application identifier to the end of the jump path when the acquired child application identifier exists in the jump path; and add the acquired child application identifier to the end of the jump path when the acquired child application identifier does not exist in the jump path.

In some embodiments, during a child application jump in an environment provided by the parent application, and the child application jumping relationship is recorded, so as to return to accessed child applications sequentially.

In an embodiment, the parent application 810 is further configured to: acquire a return instruction by using a child application to which a currently displayed child application page belongs; in response to the return instruction, determine the child application identifier corresponding to the currently displayed child application page; search the jump path for a child application identifier that is adjacent to the determined child application identifier and is located before the determined child application identifier; and return to the child application page corresponding to the found child application identifier.

In some embodiments, a processing manner of jumping from a child application and then returning to the child application is provided, so that a return may be directly made in the parent application when it is intended to return to a used child application, and the time required to exit a currently used application and then start an intended application to be returned to is avoided, and application use efficiency is improved.

In an embodiment, the parent application 810 is further configured to: return to a child application page displayed during a jump by the child application corresponding to the found child application identifier when the child application corresponding to the found child application identifier is run by the parent application in a background state; and return to a default child application page corresponding to the found child application identifier when the child application corresponding to the found child application identifier has finished running.

In some embodiments, the child application may be switched to the foreground for running to swiftly return to a page displayed by the child application to be returned to during the jump when the child application to be returned to is still run in the background, so that a user may continue to operate on the page, thereby improving application convenience. In addition, the default child application page of the child application to be returned to is directly returned to in the parent application when the child application to be returned to has finished running, so that the time for manual switching is avoided, and application use efficiency is improved.

In an embodiment, the child application includes a native plug-in child application, and the parent application 810 is further configured to: determine a consecutive native plug-in child application identifier that is adjacent to the acquired child application identifier in the jump path and is located after the acquired child application identifier when the acquired child application identifier exists in the jump path; and move the acquired child application identifier to the end of the jump path, and delete the consecutive native plug-in child application identifier in the jump path.

In some embodiments, the native plug-in child application that may be used as a child application component is provided, so that use experience when a jump is made from the child application to the native plug-in child application basically consistent with that of directly using a child application may be achieved, a process of developing a child application is avoided, and efficiency of implementing a child application is improved.

In an embodiment, the child application further includes a third-party child application. The parent application 810 is further configured to: monitor a close instruction by using the child application to which a currently displayed child application page belongs; return to the native plug-in child application corresponding to a native plug-in child application identifier when a close instruction is detected and the native plug-in child application identifier exists before a first third-party child application identifier in the jump path; and return to the parent application when a close instruction is detected and a native plug-in child application identifier does not exist before the first third-party child application identifier in the jump path.

In some embodiments, it is only necessary to trigger a close instruction to directly return to the parent application or the native plug-in child application when a child application jump is completed and it is intended to close a running third-party child application, so that the time required to close third-party child applications one by one is avoided, and application use efficiency is improved.

In an embodiment, the parent application 810 is further configured to: acquire a native plug-in child application identifier that is adjacent to the first third-party child application identifier and is located before the first third-party child application identifier when more than one native plug-in child application identifier exists before the first third-party child application identifier in the jump path; determine a native plug-in child application page displayed during a jump by a native plug-in child application corresponding to the acquired native plug-in child application identifier; and display the determined native plug-in child application page.

In some embodiments, because the native plug-in child application is configured to implement a function of the parent application and the native plug-in child application and the parent application are considered as a whole, a direct return is made to the parent application or the native plug-in child application when it is intended to close a running third-party child application, and indirect control using the third-party child application is not required, so that application use efficiency is improved.

In an embodiment, the parent application 810 is further configured to: switch to a parent application page used for triggering a child application jump; trigger, by using the parent application page, acquisition of page data corresponding to the child application identifier; and transfer the page data to the child application that corresponds to the child application identifier and is run by the parent application.

In some embodiments, a switch is made to the parent application page used for triggering a child application jump to implement a child application jump, thereby providing a new way for a child application jump.

In an embodiment, the parent application 810 is further configured to: acquire a parent application page identifier corresponding to a switched-to parent application page and a jump path used for recording one or more existing child application jumping relationships; delete a parent application page identifier that is adjacent to the acquired child application identifier in the jump path and is located after the acquired child application identifier when the acquired child application identifier exists in the jump path; add the acquired parent application page identifier to the end of the jump path; and move the child application identifier acquired in the jump path after the added parent application page identifier.

In some embodiments, during a child application jump in an environment provided by the parent application, the child application jumping relationship reflecting a child application jump manner is recorded, so as to return to accessed child applications or parent application pages sequentially.

Figure 9:
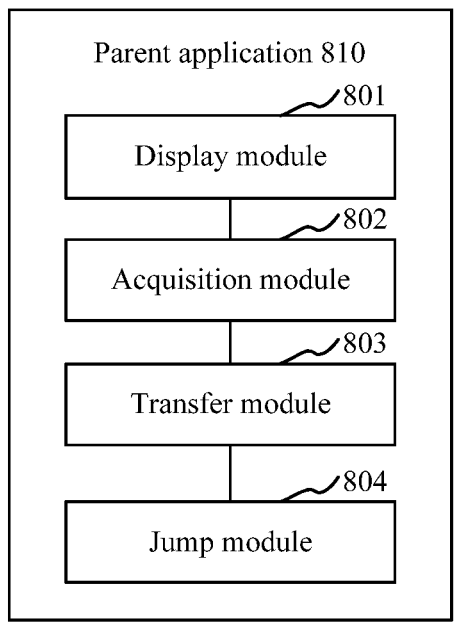
FIG. 9 is a structural modular diagram of a parent application according to an embodiment of the present application.

As shown in FIG. 9, in an embodiment, a structural modular diagram of the parent application 810 is provided. Referring to FIG. 9, the parent application 810 includes a display module 801, an acquisition module 802, a transfer module 803, and a jump module 804.

The display module 801 is configured to display a child application page of a running child application.

The acquisition module 802 is configured to acquire, by using the child application, a child application identifier corresponding to a child application to be jumped to.

The transfer module 803 is configured to transfer page data corresponding to the child application identifier to the child application that corresponds to the child application identifier and is run by the parent application.

The jump module 804 is configured to generate, by using the child application corresponding to the child application identifier and according to the page data, a child application page displayed over the displayed child application page.

For the foregoing parent application 810, a child application may be run by the parent application, and a child application page that belongs to the child application is displayed. The parent application only needs to acquire, by using the child application, a child application identifier corresponding to a child application to be jumped to before the parent application can transfer page data corresponding to the child application identifier to the child application that corresponds to the child application identifier and is run by the parent application when it is necessary to make a child application jump, and the child application corresponding to the child application identifier may then generate, according to the page data, a child application page displayed over the displayed child application page, so as to automatically implement the child application jump. The time required to exit a currently used application and then start an intended application to be jumped to is avoided, and application use efficiency is improved.

In an embodiment, the acquisition module 802 is further configured to acquire a jump path used for recording one or more existing child application jumping relationships; move the acquired child application identifier to the end of the jump path when the acquired child application identifier exists in the jump path; and add the acquired child application identifier to the end of the jump path when the acquired child application identifier does not exist in the jump path.

In some embodiments, during the child application jump in the parent application, and the child application jumping relationship is recorded, so as to return to accessed child applications sequentially.

Figure 10:
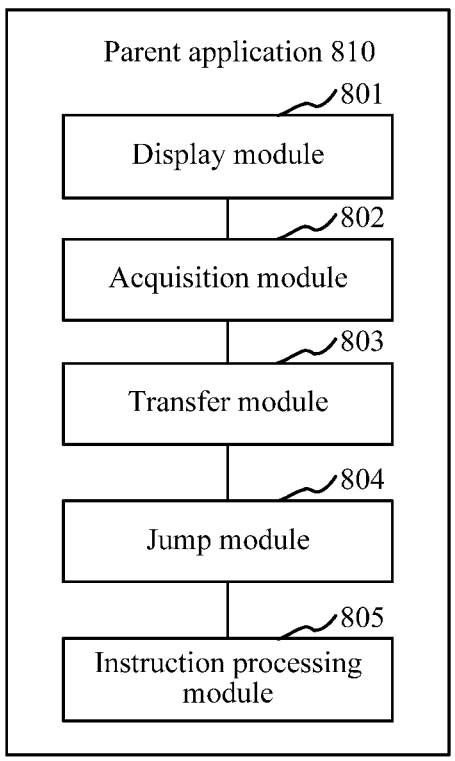
FIG. 10 is a structural modular diagram of a parent application according to another embodiment of the present application.

As shown in FIG. 10, in an embodiment, the parent application 810 further includes an instruction processing module 805.

The instruction processing module 805 is configured to: acquire a return instruction by using a child application to which a currently displayed child application page belongs; in response to the return instruction, determine the child application identifier corresponding to the currently displayed child application page; search the jump path for a child application identifier that is adjacent to the determined child application identifier and is located before the determined child application identifier; and return to the child application page corresponding to the found child application identifier.

In some embodiments, a processing manner of jumping from a child application and then returning to the child application is provided, so that a return may be directly made in the parent application when it is intended to return to a used child application, and the time required to exit a currently used application and then start an intended application to be returned to is avoided, and application use efficiency is improved.

In an embodiment, the instruction processing module 805 is further configured to: return to a child application page displayed during a jump by the child application corresponding to the found child application identifier when the child application corresponding to the found child application identifier is run by the parent application in a background state; and return to a default child application page corresponding to the found child application identifier when the child application corresponding to the found child application identifier has finished running.

In some embodiments, the child application may be switched to the foreground for running to swiftly return to a page displayed by the child application to be returned to during the jump when the child application to be returned to is still run in the background, so that the user may continue to operate on the page, thereby improving application convenience. In addition, the default child application page of the child application to be returned to is directly returned to in the parent application when the child application to be returned to has finished running, so that the time for manual switching is avoided, and application use efficiency is improved.

In an embodiment, the child application includes a native plug-in child application, and the acquisition module 802 is further configured to: determine a consecutive native plug-in child application identifier that is adjacent to the acquired child application identifier in the jump path and is located after the acquired child application identifier when the acquired child application identifier exists in the jump path; and move the acquired child application identifier to the end of the jump path, and delete the consecutive native plug-in child application identifier in the jump path.

In some embodiments, the native plug-in child application that may be used as a child application component is provided, so that during a jump from the child application to the native plug-in child application, use experience basically consistent with that of directly using a child application may be achieved, so that a process of developing a child application is avoided, and efficiency of implementing a child application is improved.

In an embodiment, the child application further includes a third-party child application. The instruction processing module 805 is further configured to: monitor a close instruction by using the child application to which a currently displayed child application page belongs; return to the native plug-in child application corresponding to a native plug-in child application identifier when a close instruction is detected and the native plug-in child application identifier exists before a first third-party child application identifier in the jump path; and return to the parent application when a close instruction is detected and a native plug-in child application identifier does not exist before the first third-party child application identifier in the jump path.

In some embodiments, it is only necessary to trigger a close instruction to directly return to the parent application or the native plug-in child application when the child application jump is completed and it is intended to close a running third-party child application, so that the time required to close third-party child applications one by one is avoided, and application use efficiency is improved.

In an embodiment, the instruction processing module 805 is further configured to: acquire a native plug-in child application identifier that is adjacent to the first third-party child application identifier and is located before the first third-party child application identifier when more than one native plug-in child application identifier exists before the first third-party child application identifier in the jump path; determine a native plug-in child application page displayed during a jump by a native plug-in child application corresponding to the acquired native plug-in child application identifier; and display the determined native plug-in child application page.

In some embodiments, the native plug-in child application is configured to implement a function of the parent application and the native plug-in child application and the parent application are considered as a whole, a direct return is made to the parent application or the native plug-in child application when it is intended to close a running third-party child application, and indirect control using the third-party child application is not required, so that application use efficiency is improved.

In an embodiment, the transfer module 803 is further configured to: switch to a parent application page used for triggering a child application jump; trigger, by using the parent application page, acquisition of page data corresponding to the child application identifier; and transfer the page data to the child application that corresponds to the child application identifier and is run by the parent application.

In some embodiments, a switch is made to the parent application page used for triggering a child application jump to implement a child application jump, thereby providing a new way for a child application jump.

In an embodiment, the acquisition module 802 is further configured to: acquire a parent application page identifier corresponding to the switched-to parent application page and a jump path used for recording one or more existing child application jumping relationships; delete a parent application page identifier that is adjacent to the acquired child application identifier in the jump path and is located after the acquired child application identifier when the acquired child application identifier exists in the jump path; add the acquired parent application page identifier to the end of the jump path; and move the child application identifier acquired in the jump path after the added parent application page identifier.

In some embodiments, during a child application jump in an environment provided by the parent application, the child application jumping relationship reflecting a child application jump manner is recorded, so as to return to accessed child applications or parent application pages sequentially.

Figure 11:
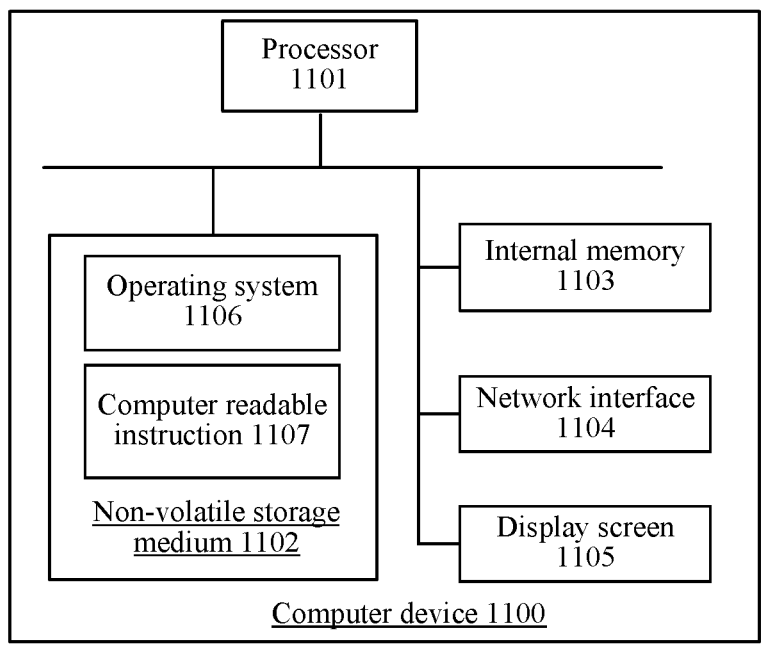
FIG. 11 is an internal structural diagram of a computer device according to an embodiment of the present application.

FIG. 11 is an internal structural diagram of a computer device according to an embodiment. The computer device may be specifically the terminal 110 in FIG. 1. As shown in FIG. 11, the computer device 1100 includes a processor 1101, a non-volatile storage medium 1102, an internal memory 1103, a network interface 1104, and a display screen 1105 that are connected via a system bus. The non-volatile storage medium 1102 of the computer device 1100 may store an OS 1106 and computer readable instructions 1107. When being executed, the computer readable instructions 1107 enable the processor 1101 to perform an application processing method. The processor 1101 is configured to provide computing and control capabilities to supporting the running of the entire computer device. The internal memory 1103 may store the computer readable instructions 1107. When being executed by the processor 1101, the computer readable instructions 1107 may enable the processor 1101 to perform the application processing method. The network interface 1104 is configured to perform network communication with a server, for example, send a collaborative operation authorization request to the server, and receive an authorization response returned by the server. A display screen of the computer device 1100 may be a liquid crystal display screen, an electronic ink display screen or the like. The computer device 1100 may be a mobile phone, a tablet computer, a personal digital assistant, a wearable device or the like. A person skilled in the art may understand that the structure shown in FIG. 11 is only a block diagram of a partial structure related to the solution in the present application, but do not constitute a limitation to the computer device to which the solution in the present application is applied. A specific computer device may include more or fewer components than those in the figure, or some components may be combined, or a different component deployment may be used.

In an embodiment, the application processing apparatus provided in the present application may be implemented in the form of a computer program. The computer program may be executed by the computer device 1100 shown in FIG. 11. A non-volatile storage medium of the computer device may store program modules that form the application processing apparatus, for example, the parent application 810 shown in FIG. 8. The program modules include computer readable instructions. The computer readable instructions are used for enabling the computer device to perform the steps in the application processing method in the embodiments of the present application described in the specification. For example, the computer device may display, by using the parent application 810 in the application processing apparatus 800 shown in FIG. 8, a child application page of a running child application; acquire, by using the child application, a child application identifier corresponding to a child application to be jumped to; transfer page data corresponding to the child application identifier to the child application that corresponds to the child application identifier and is run by the parent application; and generate, by using the child application corresponding to the child application identifier and according to the page data, a child application page displayed over the displayed child application page.

In an embodiment, a computer readable storage medium is provided. The computer readable storage medium stores computer readable instructions. When being executed by a processor, the computer readable instructions enable the processor to perform the following steps: displaying a child application page of a child application run by a parent application; acquiring, by using the child application, a child application identifier corresponding to a child application to be jumped to; transferring page data corresponding to the child application identifier to the child application that corresponds to the child application identifier and is run by the parent application; and generating, by using the child application corresponding to the child application identifier and according to the page data, a child application page displayed over the displayed child application page.

In an embodiment, the computer readable instructions enable the processor to further perform, after the acquiring, by using the child application, a child application identifier corresponding to a child application to be jumped to, the following steps: acquiring a jump path used for recording one or more existing child application jumping relationships; moving the acquired child application identifier to the end of the jump path when the acquired child application identifier exists in the jump path; and adding the acquired child application identifier to the end of the jump path when the acquired child application identifier does not exist in the jump path.

In an embodiment, the computer readable instructions further enable the processor to perform the following steps: acquiring a return instruction by using a child application to which a currently displayed child application page belongs; in response to the return instruction, determining the child application identifier corresponding to the currently displayed child application page; searching the jump path for a child application identifier that is adjacent to the determined child application identifier and is located before the determined child application identifier; and returning to the child application page corresponding to the found child application identifier.

In an embodiment, the returning to the child application page corresponding to the found child application identifier includes: returning to a child application page displayed during a jump by the child application corresponding to the found child application identifier when the child application corresponding to the found child application identifier is run by the parent application in a background state; and returning to a default child application page corresponding to the found child application identifier when the child application corresponding to the found child application identifier has finished running.

In an embodiment, the child application includes a native plug-in child application, and the moving the acquired child application identifier to the end of the jump path when the acquired child application identifier exists in the jump path includes: determining a consecutive native plug-in child application identifier that is adjacent to the acquired child application identifier in the jump path and is located after the acquired child application identifier when the acquired child application identifier exists in the jump path; and moving the acquired child application identifier to the end of the jump path, and deleting the consecutive native plug-in child application identifier in the jump path.

In an embodiment, the child application further includes a third-party child application. The computer readable instructions further enable the processor to perform the following steps: monitoring a close instruction by using a child application to which the currently displayed child application page belongs; returning to the native plug-in child application corresponding to a native plug-in child application identifier when a close instruction is detected and the native plug-in child application identifier exists before a first third-party child application identifier in the jump path; and returning to the parent application when a close instruction is detected and a native plug-in child application identifier does not exist before the first third-party child application identifier in the jump path.

In an embodiment, the returning to a native plug-in child application corresponding to a native plug-in child application identifier includes: acquiring a native plug-in child application identifier that is adjacent to the first third-party child application identifier and is located before the first third-party child application identifier when more than one native plug-in child application identifier exists before the first third-party child application identifier in the jump path; determining a native plug-in child application page displayed during a jump by a native plug-in child application corresponding to the acquired native plug-in child application identifier; and displaying the determined native plug-in child application page.

In an embodiment, the transferring page data corresponding to the child application identifier to the child application that corresponds to the child application identifier and is run by the parent application includes: switching to a parent application page used for triggering a child application jump; triggering, by using the parent application page, acquisition of page data corresponding to the child application identifier; and transferring the page data to the child application that corresponds to the child application identifier and is run by the parent application.

In an embodiment, the computer readable instructions enable the processor to further perform, after the acquiring, by using the child application, a child application identifier corresponding to a child application to be jumped to, the following steps: acquiring a parent application page identifier corresponding to a switched-to parent application page and a jump path used for recording one or more existing child application jumping relationships; deleting a parent application page identifier that is adjacent to the acquired child application identifier in the jump path and is located after the acquired child application identifier when the acquired child application identifier exists in the jump path; adding the acquired parent application page identifier to the end of the jump path; and moving the child application identifier acquired in the jump path after the added parent application page identifier.

For the foregoing storage medium, a parent application runs on an OS, a child application may be run by the parent application, and a child application page that belongs to the child application is displayed. The parent application only needs to acquire, by using the child application, a child application identifier corresponding to a child application to be jumped to before the parent application can transfer page data corresponding to the child application identifier to the child application that corresponds to the child application identifier and is run by the parent application when it is necessary to make a child application jump, and the child application corresponding to the child application identifier may then generate, according to the page data, a child application page displayed over the displayed child application page, so as to automatically implement the child application jump. The time required to exit a currently used application and then start an intended application to be jumped to is avoided, and application use efficiency is improved.

In an embodiment, a computer device is provided, including a memory and a processor. The memory stores computer readable instructions. When being executed by the processor, the computer readable instructions enable the processor to perform the following steps: displaying a child application page of a child application run by a parent application; acquiring, by using the child application, a child application identifier corresponding to a child application to be jumped to; transferring page data corresponding to the child application identifier to the child application that corresponds to the child application identifier and is run by the parent application; and generating, by using the child application corresponding to the child application identifier and according to the page data, a child application page displayed over the displayed child application page.

In an embodiment, the computer readable instructions enable the processor to further perform, after the acquiring, by using the child application, a child application identifier corresponding to a child application to be jumped to, the following steps: acquiring a jump path used for recording one or more existing child application jumping relationships; moving the acquired child application identifier to the end of the jump path when the acquired child application identifier exists in the jump path; and adding the acquired child application identifier to the end of the jump path when the acquired child application identifier does not exist in the jump path.

In an embodiment, the computer readable instructions further enable the processor to perform the following steps: acquiring a return instruction by using a child application to which a currently displayed child application page belongs; in response to the return instruction, determining the child application identifier corresponding to the currently displayed child application page; searching the jump path for a child application identifier that is adjacent to the determined child application identifier and is located before the determined child application identifier; and returning to the child application page corresponding to the found child application identifier.

In an embodiment, the returning to the child application page corresponding to the found child application identifier includes: returning to a child application page displayed during a jump by the child application corresponding to the found child application identifier when the child application corresponding to the found child application identifier is run by the parent application in a background state; and returning to a default child application page corresponding to the found child application identifier when the child application corresponding to the found child application identifier has finished running.

In an embodiment, the child application includes a native plug-in child application, and the moving the acquired child application identifier to the end of the jump path when the acquired child application identifier exists in the jump path includes: determining a consecutive native plug-in child application identifier that is adjacent to the acquired child application identifier in the jump path and is located after the acquired child application identifier when the acquired child application identifier exists in the jump path; and moving the acquired child application identifier to the end of the jump path, and deleting the consecutive native plug-in child application identifier in the jump path.

In an embodiment, the child application further includes a third-party child application. The computer readable instructions further enable the processor to perform the following steps: monitoring a close instruction by using the child application to which a currently displayed child application page belongs; returning to the native plug-in child application corresponding to a native plug-in child application identifier when a close instruction is detected and the native plug-in child application identifier exists before a first third-party child application identifier in the jump path; and returning to the parent application when a close instruction is detected and a native plug-in child application identifier does not exist before the first third-party child application identifier in the jump path.

In an embodiment, the returning to a native plug-in child application corresponding to a native plug-in child application identifier includes: acquiring a native plug-in child application identifier that is adjacent to the first third-party child application identifier and is located before the first third-party child application identifier when more than one native plug-in child application identifier exists before the first third-party child application identifier in the jump path; determining a native plug-in child application page displayed during a jump by a native plug-in child application corresponding to the acquired native plug-in child application identifier; and displaying the determined native plug-in child application page.

In an embodiment, the transferring page data corresponding to the child application identifier to the child application that corresponds to the child application identifier and is run by the parent application includes: switching to a parent application page used for triggering a child application jump; triggering, by using the parent application page, acquisition of page data corresponding to the child application identifier; and transferring the page data to the child application that corresponds to the child application identifier and is run by the parent application.

In an embodiment, the computer readable instructions enable the processor to further perform, after the acquiring, by using the child application, a child application identifier corresponding to a child application to be jumped to, the following steps: acquiring a parent application page identifier corresponding to a switched-to parent application page and a jump path used for recording one or more existing child application jumping relationships; deleting a parent application page identifier that is adjacent to the acquired child application identifier in the jump path and is located after the acquired child application identifier when the acquired child application identifier exists in the jump path; adding the acquired parent application page identifier to the end of the jump path; and moving the child application identifier acquired in the jump path after the added parent application page identifier.

For the foregoing computer device, a parent application runs on an OS, a child application may be run by the parent application, and a child application page that belongs to the child application is displayed. The parent application only needs to acquire, by using the child application, a child application identifier corresponding to a child application to be jumped to before the parent application can transfer page data corresponding to the child application identifier to the child application that corresponds to the child application identifier and is run by the parent application when it is necessary to make a child application jump, and the child application corresponding to the child application identifier may then generate, according to the page data, a child application page displayed over the displayed child application page, so as to automatically implement the child application jump. The time required to exit a currently used application and then start an intended application to be jumped to is avoided, and application use efficiency is improved.

A person of ordinary skill in the art may understand that all or some of the processes of the methods in the foregoing embodiments may be implemented by a computer program instructing relevant hardware. The program may be stored in a non-volatile computer-readable storage medium. When the program is executed, the processes of the foregoing methods in the embodiments are performed. The storage medium may be a magnetic disk, an optical disc, a Read-Only Memory (ROM), and the like.

The technical features of the foregoing embodiments may be randomly combined. For the purpose of concise descriptions, not all possible combinations of the technical features in the foregoing embodiments are described, but as long as combinations of the technical features do not conflict each other, the combinations of the technical features should be considered as falling within the scope of this specification.

The foregoing embodiments show only several implementations of the present application, and descriptions thereof are in detail, but shall not be understood as limiting the patent scope of the present application. It should be noted that various changes and improvements may further be made by a person of ordinary skill in the art without departing from the idea of the present application, and these changes and improvements all fall within the protection scope of the present application. Therefore, the protection scope of the present application shall be subject to the appended claims.

What is claimed is:

1. An application processing method, applied to a terminal, the method comprising:
displaying a first child application page of a first child application, the first child application being run by a parent application;
acquiring, by the first child application, a second child application identifier corresponding to a second child application to be jumped to, the second child application comprises at least one of a native plug-in child application or a third-party child application;
acquiring a jump path used for recording one or more existing child application jumping relationships, the jump path including one or more child application identifiers arranged in a specific sequence based on one or more previous jumps;
moving the second child application identifier to an end of the jump path when the second child application identifier exists in the jump path, wherein when the second child application is a native plug-in child application, one or more consecutive native plug-in child application identifiers adjacent to and after the second child application identifier in the jump path are deleted;
adding the second child application identifier to the end of the jump path when the second child application identifier does not exist in the jump path;
running, by the parent application, the second child application when a jump is made from the first child application to the second child application;
transferring, by the parent application, page data corresponding to the second child application identifier to the second child application;
generating, according to the page data, a second child application page over the first child application page; and
displaying the second child application page.

2. The method according to claim 1, further comprising:
acquiring a return instruction from the second child application;
determining the second child application identifier in response to the return instruction;
searching the jump path for a third child application identifier that is adjacent to the second child application identifier and is located before the second child application identifier; and
returning to a third child application page corresponding to the third child application identifier.

3. The method according to claim 2, wherein the returning to a third child application page corresponding to the third child application identifier comprises:
when a third child application corresponding to the third child application identifier is run by the parent application in a background state, returning to the third child application page corresponding to the third child application left during a corresponding previous jump; and
when the third child application corresponding to the third child application identifier has finished running, returning to a default child application page corresponding to the third child application identifier.

4. The method according to claim 1, wherein the second child application is a third-party child application, and the method further comprises:
monitoring a close instruction by using the second child application;
when a close instruction is detected and a first native plug-in child application identifier exists before a foremost third-party child application identifier in the jump path, returning to a first native plug-in child application corresponding to the first native plug-in child application identifier; and when a close instruction is detected and the first native plug-in child application identifier does not exist before the foremost third-party child application identifier in the jump path, returning to the parent application.

5. The method according to claim 4, wherein the returning to a first native plug-in child application corresponding to the first native plug-in child application identifier comprises:
when more than one first native plug-in child application identifier exists before the foremost third-party child application identifier in the jump path,
acquiring a second native plug-in child application identifier, wherein the second native plug-in child application identifier is adjacent to the first third-party child application identifier and is located before the first third-party child application identifier;
determining a second native plug-in child application page, wherein the second native plug-in child application page is a page corresponding to a second native plug-in child application corresponding to the second native plug-in child application identifier during a jump; and
displaying the second native plug-in child application page.

6. The method according to claim 1, wherein the transferring page data corresponding to the second child application identifier to the second child application comprises:
switching to a parent application page used for triggering a child application jump, wherein the parent application page is a page displayed by the parent application;
triggering, by using the parent application page, acquisition of the page data corresponding to the second child application identifier; and
transferring the page data to the second child application.

7. The method according to claim 1, wherein after the acquiring, by using the first child application, a second child application identifier corresponding to a second child application to be jumped to, the method further comprises:
acquiring a first parent application page identifier corresponding to a switched-to first parent application page and a jump path used for recording one or more existing child application jumping relationships, the jump path including one or more child application identifiers arranged in a specific sequence based on one or more previous jumps;
when the acquired second child application identifier exists in the jump path,
deleting a second parent application page identifier that is adjacent to the second child application identifier in the jump path and is located after the second child application identifier;
adding the first parent application page identifier to the end of the jump path; and
moving the second child application identifier after the first parent application page identifier.

8. An application processing apparatus, comprising a processor and a memory, the memory storing computer readable instructions, and the instructions causing the processor to:
display a first child application page of a first child application, the first child application being run by a parent application;
acquire, by using the first child application, a second child application identifier corresponding to a second child application to be jumped to, the second child application comprises at least one of a native plug-in child application or a third-party child application;
acquire a jump path used for recording one or more existing child application jumping relationships, the jump path including one or more child application identifiers arranged in a specific sequence based on one or more previous jumps;
move the second child application identifier to an end of the jump path when the second child application identifier exists in the jump path, wherein when the second child application is a native plug-in child application, a consecutive native plug-in child application identifier adjacent to and after the second child application identifier in the jump path is deleted;
add the second child application identifier to the end of the jump path when the second child application identifier does not exist in the jump path;
run, by the parent application, the second child application when a jump is made from the first child application to the second child application;
transfer, by the parent application, page data corresponding to the second child application identifier to the second child application;
generate, according to the page data, a second child application page over the first child application page; and
display the second child application page.

9. The apparatus according to claim 8, wherein the computer readable instructions further cause the processor to:
acquire a return instruction by using the second child application;
determine the second child application identifier in response to the return instruction;
search the jump path for a third child application identifier that is adjacent to the second child application identifier and is located before the second child application identifier; and
return to a third child application page corresponding to the third child application identifier.

10. The apparatus according to claim 9, wherein the computer readable instructions further cause the processor to:
when a third child application corresponding to the third child application identifier is run by the parent application in a background state, return to the third child application page corresponding to the third child application left during a corresponding previous jump;
when the third child application corresponding to the third child application identifier has finished running, return to a default child application page corresponding to the third child application identifier.

11. The apparatus according to claim 8, wherein the child application is a third-party child application, and the computer readable instructions further cause the processor to:
monitor a close instruction by using the second child application;
when a close instruction is detected and a first native plug-in child application identifier exists before a foremost third-party child application identifier in the jump path, returning to a first native plug-in child application corresponding to the first native plug-in child application identifier; and
when a close instruction is detected and the first native plug-in child application identifier does not exist before the foremost third-party child application identifier in the jump path, return to the parent application.

12. The apparatus according to claim 11, wherein the computer readable instructions further cause the processor to:

when more than one first native plug-in child application identifier exists before the foremost third-party child application identifier in the jump path, acquire a second native plug-in child application identifier, wherein the second native plug-in child application identifier is adjacent to the first third-party child application identifier and is located before the first third-party child application identifier;

determine a second native plug-in child application page, wherein the second native plug-in child application page is a page corresponding to a second native plug-in child application corresponding to the second native plug-in child application identifier during a jump; and display the second native plug-in child application page.

13. The apparatus according to claim 8, wherein the computer readable instructions further cause the processor to:

switch to a parent application page used for triggering a child application jump, wherein the parent application page is a page displayed by the parent application;

trigger, by using the parent application page, acquisition of the page data corresponding to the second child application identifier; and transfer the page data to the second child application.

14. The apparatus according to claim 8, wherein the computer readable instructions further cause the processor to:

acquire a first parent application page identifier corresponding to a switched-to first parent application page and a jump path used for recording one or more existing child application jumping relationships, the jump path including one or more child application identifiers arranged in a specific sequence based on one or more previous jumps;

when the acquired second child application identifier exists in the jump path, delete a second parent application page identifier that is adjacent to the second child application identifier in the jump path and is located after the second child application identifier;

add the first parent application page identifier to the end of the jump path; and move the second child application identifier after the first parent application page identifier.

15. A non-transitory computer readable storage medium storing computer readable instructions, when being executed by a processor, the computer readable instructions causing the processor to perform:

displaying a first child application page of a first child application, the first child application being run by a parent application;

acquiring, by the first child application, a second child application identifier corresponding to a second child application to be jumped to, the second child application comprises at least one of a native plug-in child application or a third-party child application;

acquiring a jump path used for recording one or more existing child application jumping relationships, the jump path including one or more child application identifiers arranged in a specific sequence based on one or more previous jumps;

moving the second child application identifier to an end of the jump path when the second child application identifier exists in the jump path, wherein when the second child application is a native plug-in child application, a consecutive native plug-in child application identifier adjacent to and after the second child application identifier in the jump path is deleted;

adding the second child application identifier to the end of the jump path when the second child application identifier does not exist in the jump path;

running, by the parent application, the second child application when a jump is made from the first child application to the second child application;

transferring, by the parent application, page data corresponding to the second child application identifier to the second child application;

generating, according to the page data, a second child application page over the first child application page; and displaying the second child application page.

* * * * *